March 4, 1958  A. J. BRANNSTROM ET AL  2,825,277
FEEDING MECHANISM FOR BALERS
Filed June 23, 1955  3 Sheets-Sheet 1
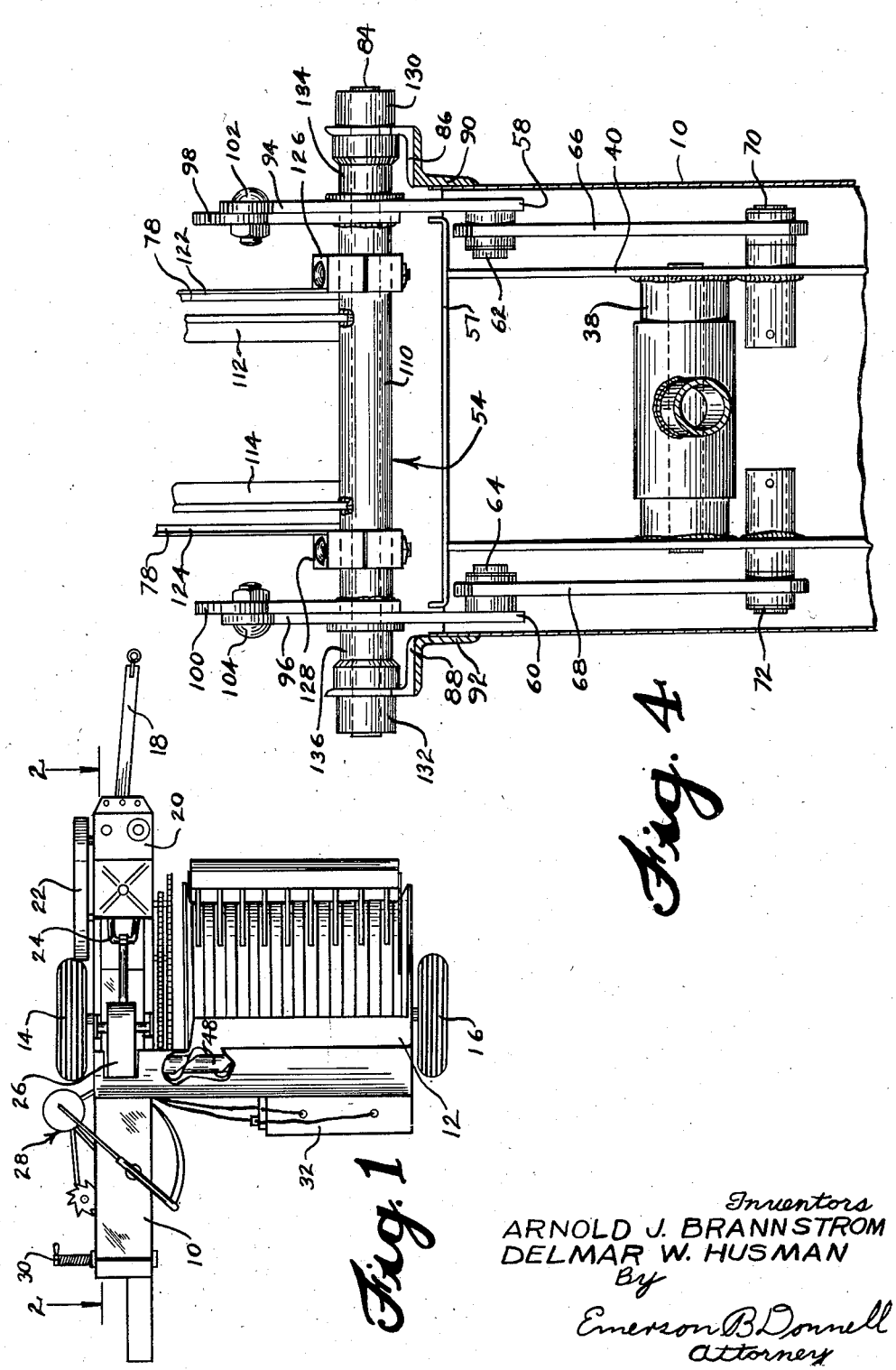
Inventors
ARNOLD J. BRANNSTROM
DELMAR W. HUSMAN
By
Emerson B Donnell
Attorney

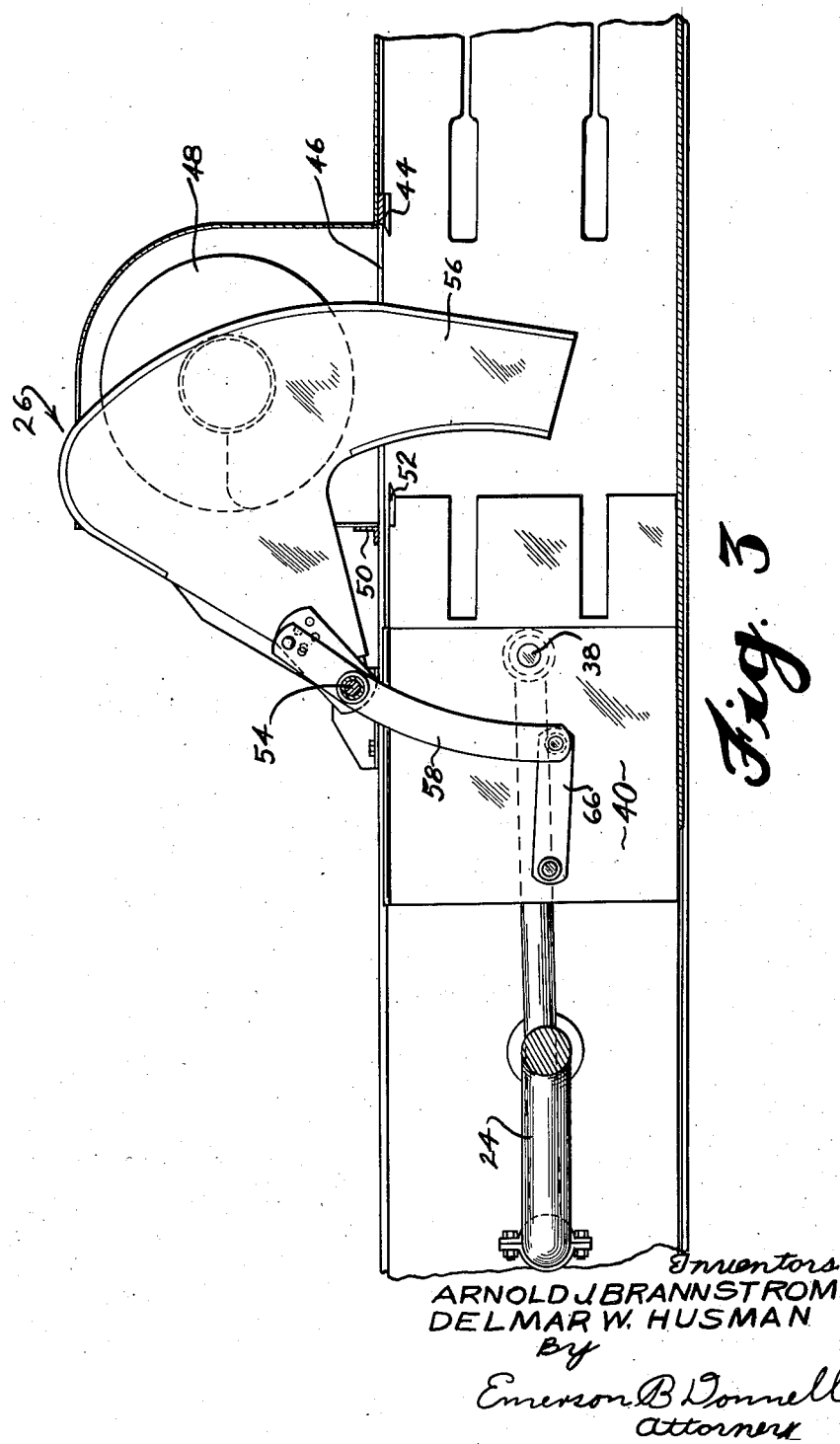

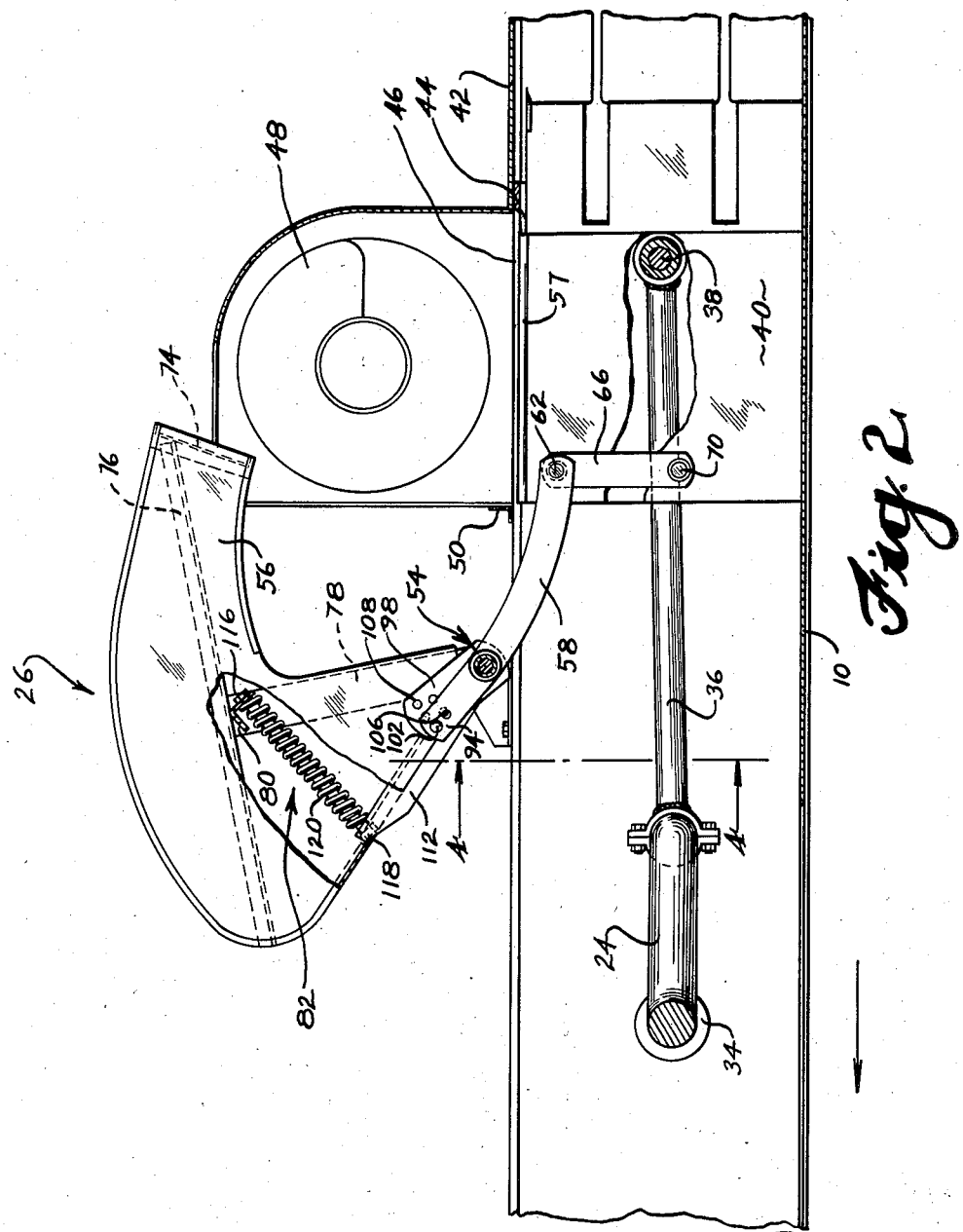

United States Patent Office 2,825,277
Patented Mar. 4, 1958

2,825,277
FEEDING MECHANISM FOR BALERS

Arnold J. Brannstrom, Milwaukee, and Delmar W. Husman, Racine, Wis., assignors to J. I. Case Company, Racine, Wis., a corporation of Wisconsin Application June 23, 1955, Serial No. 517,512

7 Claims. (Cl. 100—142)

The present invention relates to balers and the feeding mechanism therefor, particularly pick-up balers and an object thereof is to generally improve the construction and operation of devices of this type.

Balers for hay and related crop material have been made for many years and feeding devices of many different types have been devised for forcing or stuffing the crop material into the bale case in advance of the compressing plunger, many of them characterized by numerous joints, links, lever arms and the like. A desirable characteristic of such feeding devices is that they shall move to a position completely clear of the feeding opening to allow for the accumulation of a substantial amount of material, and then move quickly into the opening and out again so that another body of material may accumulate. In short the feeder should stay in the bale case the shortest practical time and stay out of the bale case the longest practical time in each cycle of operations, and a further object is to provide such a feeding device which is exceedingly simple, which will be operative to achieve the described action, which is readily adjustable for various conditions, which may yield if it encounters an obstruction and which is characterized by a simple and compact driving mechanism which is readily enclosed within a portion of the bale case. The manner in which these results are accomplished is fully set forth in the following specification and illustrated in the accompanying drawings in which a typical example is shown but it is to be understood that the invention is not to be taken as limited by the specification or drawings or in fact in any manner except as defined in the claims.

In the drawings Figure 1 is a plan view of a pick-up baler of the type in which the invention is utilized.

Fig. 2 is an enlarged sectional view taken substantially on the line 2—2 of Fig. 1 with parts removed and others broken away to show what lies beneath.

Fig. 3 is a similar view with the parts in a different position and,

Fig. 4 is a vertical sectional view taken on the line 4—4 of Fig. 2.

Similar reference characters have been applied to the same parts throughout the drawings and specification.

The machine as seen in Fig. 1 comprises a generally T-shaped assemblage including a bale case 10 extending in the direction of travel and a pick-up and feeder unit 12 extending generally transverse to bale case 10, the whole being carried on the ground engaging wheels 14 and 16 and propelled by a tractor or the like, not shown, connected with a drawbar 18. An engine 20 actuates through suitable drive mechanism 22 a crank shaft 24 which actuates the compressing plunger and feeder head 26 as will appear, and the bales are tied by suitable mechanism generally designated as 28 but forming no part of the present invention. Bale compressing mechanism 30 determines the density of the resulting bales and a supply of twine or tying material 32 is carried in the present instance on the pick-up and feeding unit 12.

Turning now to Fig. 2 crank shaft 24 is journaled in a suitable bearing 34 and actuates a pitman 36 journaled on a suitable wrist pin construction 38 connected with a plunger 40 which it reciprocates in bale case 10 for compressing the crop material. Bale case 10 includes an upper wall 42 which terminates at a knife unit 44 defining a feed opening 46 through which the crop material must be introduced, the latter being brought to the opening by an auger 48 in the present instance, although insofar as the invention is concerned other conveying means could be used in place of auger 48, other types of feeding means being well-known.

As seen in Fig. 3 plunger 40 after a half turn of crank shaft 24 moves to the left to a position virtually completely clear of opening 46, the forward margin of the opening being defined by an angle iron 50. A knife 52 on plunger 40 cooperates with knife 44 to cut the material as the plunger approaches its inner-most position so that the bales are composed of individual folded slices as is well-known.

Crop material conveyed by auger 48 arrives above opening 46 and is pressed, downwardly in the present instance, by above-mentioned feeder head 26, the latter being a generally L-shaped box-like structure adapted to oscillate about a shaft 54 and having a generally arcuate section 56, shaft 54 and portion 56 being so shaped and positioned that oscillating of the assemblage about shaft 54 will project portion 56 through opening 46 into bale case 10.

As is understood this action must be timed in relation to the reciprocations of plunger 40 so that section 56 and plunger 40 will not conflict, the manner in which these motions are related being well shown in Figs. 2 and 3.

As seen in Fig. 2 it will be apparent that plunger 40 closes opening 46 by means of an upper wall 57 when the plunger is in its rear-most position, the direction of progress of the machine being to the left as seen in Figs. 2 and 3.

Feeder head 26 is fixed in a manner to be described in relation to shaft 54 with which is also fixed a pair of lever arms 58 and 60 best seen in Fig. 4 which in the position shown in Fig. 2 extend generally rearwardly and are pivotally connected at 62 and 64 respectively with generally vertically extending links 66 and 68. Links 66 and 68 are connected by suitable pivots or studs 70 and 72 with plunger 40, movement of the plunger through the above described link and lever connection actuating feeder head 26.

It will be observed that in the position of the parts shown in Fig. 2 that link 66 is in substantially dead center relation to lever 58 such that movements of plunger 40 will cause slight or inconsequential movement of lever 58 until plunger 40 has moved an appreciable distance. On the other hand in the position shown in Fig. 3 link 66, rather than swinging, moves substantially in the direction of its length whenever plunger 40 moves. Therefore slight movement of plunger 40 will cause virtually the same amount of movement in lever 58 and of course in feeder head 26, lever 58 and feeder head 26 both being fixed in relation to shaft 54. Thus it will be apparent that substantially uniform movement of plunger 40 back and forth will cause only very slow movement of head 26 in the region of the Fig. 2 position whereas it will cause comparatively rapid movement of head 26 in the region of the Fig. 3 position. In this way the feeder head 26 is caused to remain or dwell in the Fig. 2 position a comparatively long time during each cycle but to move into and out of the bale case or Fig. 3 position relatively much more rapidly.

Feeder head 26 is formed of suitable material such for example as sheet metal, portion 56 being substantially rectangular in cross-section and having an end wall or closure 74 so that it will effectively engage material placed above opening 46 by auger 48. Feeder head 26 is built on a frame comprising angle irons or the like 76 extending generally lengthwise of section 56 and fixed to side plates or strips 78, such structure being duplicated within the two sides of feeder head 26 and connected by an angle iron, strut or the like 80 serving to unite the two parts of the frame and connect one side of the feeder head with the other. Angle iron 80 also works in connection with the resilient safety release generally designated as 82 as will now be explained.

Shaft 54 in the present instance is formed of a pipe journaled on a rod 84 supported in brackets 86 and 88 carried on upper flanges 90 and 92 of bale case 10, above mentioned lever arms 58 and 60 being journaled on rod 84 and having quadrant portions 94 and 96 projecting beyond shaft 54 and along side plates 98 and 100 to which they are secured by bolts or the like 102 and 104. As seen in Figs. 2 and 3 the quadrant portions are provided with groups of holes 106 and 108 respectively so spaced that various pairs will align in numerous selected positions of plate 108. With bolts 102 and 104 removed plates 98 and 100 can be shifted and resecured in a new position by reinserting the bolts in new holes. This has the effect of changing the position of feeder head 26 in relation to its actuating means as will be explained.

Plates 98 and 100 are fixed as by welding or the like to above-mentioned pipe 110 to which are also welded or otherwise suitably fixed angle irons or lever arms 112 and 114, arms 112 and 114 therefore being caused to oscillate in unison with lever arms 58 and 60 and plates 98 and 100. Bolts as 116 are extended through suitable openings in angle iron strut 80 and similar openings in lever arms 112 and 114 and, by means of nuts as 118 determine a maximum possible spacing between lever arms 112 and 114 and angle iron 80 while spiral springs as 120 are carried on the bolts and serve to resiliently force lever arms 112 and 114 on the one hand and angle iron 80 on the other as far apart as permitted by bolts 118. Springs 120 are strong enough so that they maintain such maximum spacing under all normal conditions of load. However in the event of blocking of the movement of head 26 for any reason as for example by its encountering an obstruction, lever arms 112 and 114 may still move to the extent made necessary by rocking of levers 58 and 60, such movement being accommodated in spite of blocking of head 26 by compression of springs 120, bolts 116 sliding through the holes in the connected parts so as not to interfere with such compression of springs 120.

Such movement will of course entail rocking of shaft 54 relatively to the side walls 122 and 124 of head 26 and therefore said walls are connected with bearings 126 and 128 journaled on the exterior of pipe 110. Collars 130 and 132 maintain shaft 84 in position axially and spacers 134 and 136 secure the position of levers 58 and 60 axially of shaft 54.

As more particularly apparent in Fig. 4 plunger 40 is narrower than bale case 10 from the region of pivot or wrist pin 38 forwardly and since shaft 54 and its associate parts are materially forward of opening 46 they may be accommodated within bale case 10 on either side of plunger 40. As a result, in the actual machine they are virtually completely housed so as not to be dangerous to bystanders and in fact scarcely visible.

As heretofore explained the motion of plunger 40 directly actuates feeder head 26 so that there is as a result no possibility of the latter's getting out of time with the plunger. The peculiar specific arrangement of levers 58 and links 56 gives the desired quick motion into and out of the bale chamber together with a relatively slow motion or dwell at the other end of the cycle. The plunger is supported on the single axis (shaft 54) on the bale case 10 adjacent opening 46 and is protected by resilient means 120 in case its motion is blocked for any reason. In the illustrative embodiment feeder head 26 is adjusted to go to its maximum depth in bale case 10 but as will be apparent it may be adjusted to a number of shallower depths by merely changing the pair of holes connected by bolts 102 and 104.

The above being a complete disclosure of an illustrative embodiment of the invention, what is claimed as new and desired to be secured by Letters Patent of the United States is:

1. In a feeder for a baler of the type having walls enclosing a bale case, a crop compressing plunger reciprocable in the case, means for reciprocating said plunger through a predetermined stroke, and one of said walls providing an opening traversed by said plunger in the reciprocations thereof so that said plunger will extend across and close the opening in one position and will clear the opening in another position thereof, and means for conveying crop material to the region of said opening; a substantially L-shaped feeder head having a section of a size adapted to enter said opening at times when said plunger is clear of said opening, and a portion journaled on an axis adjacent said wall provided with said opening, and spaced therefrom sufficiently that the first mentioned section will pass through said opening into and out of said bale case by reason of oscillation of said L-shaped feeder head about said axis, a lever arm fixed in relation to said L-shaped head and extending transversely of the direction of movement of said plunger a distance equivalent to substantially one half of said predetermined stroke when said section is in said bale case, and a link connected to said lever and extending generally in the direction of movement of said plunger a distance equivalent to less than the length of said lever arm, away from said opening when said section is in said bale case, and connected with said plunger for oscillating said feeder head in synchronism with reciprocations of said plunger, the parts being so proportioned that said link is positioned substantially normal to the direction of movement of said plunger when the latter is at the end of its stroke closing said opening, and substantially parallel with said direction of movement when said plunger is at the end of its stroke clear of said opening.

2. In a feeder for a baler of the type having walls enclosing a bale case, a crop compressing plunger reciprocable in the case through a predetermined stroke, means for reciprocating said plunger, and one of said walls providing an opening traversed by said plunger in the reciprocations thereof so that said plunger will extend across and close the opening in one position and will clear the opening in another position thereof, and means for conveying crop material transversely of said bale case to the region of said opening; a substantially L-shaped feeder head having a section of a size adapted to enter said opening at times when said plunger is clear of said opening, and a portion journaled on an axis adjacent said wall provided with said opening, and spaced therefrom sufficiently that the first mentioned section will pass through said opening into and out of said bale case by reason of oscillation of said L-shaped feeder head about said axis, a lever arm fixed in relation to said L-shaped head and extending transversely of the direction of movement of said plunger when said section is in said bale case, and a link connected to said lever and extending generally in the direction of movement of said plunger, away from said opening when said section is in said bale case, and connected with said plunger for oscillating said feeder head in synchronism with reciprocations of said plunger, said lever arm being of a length equivalent to substantially half said stroke and so placed that said link is positioned substantially normal to the direction of movement of said plunger when the latter is at the end of its stroke closing said opening, and said link being of a length to be swung to a position extending substantially parallel with said direction of movement when said plunger is at the end of its stroke clear of said opening.

3. In a feeder for a baler of the type having walls enclosing a bale case, a crop compressing plunger reciprocable in the case, means for reciprocating said plunger, and one of said walls providing an opening traversed by said plunger in the reciprocations thereof so that said plunger will extend across and close the opening in one position and will clear the opening in another position thereof, and means for conveying crop material to the region of said opening; a substantially L-shaped feeder head having a section of a size adapted to enter said opening at times when said plunger is clear of said opening, and a portion journaled on an axis adjacent said wall provided with said opening, and spaced therefrom sufficiently that the first mentioned section will pass through said opening into and out of said bale case by reason of oscillation of said L-shaped feeder head about said axis, a lever arm fixed in relation to said L-shaped head and extending tranversely of the direction of movement of said plunger a distance exceeding one half the depth of said bale case when said section is in said bale case, and a link connected to said lever and extending generally in the direction of movement of said plunger a distance equivalent to less than the length of said lever arm, away from said opening when said section is in said bale case, and connected with said plunger for oscillating said feeder head in synchronism with reciprocations of said plunger.

4. In a feeder for a baler of the type having walls enclosing a bale case, a crop compressing plunger reciprocable in the case, means for reciprocating said plunger, and one of said walls providing an opening traversed by said plunger in the reciprocations thereof so that said plunger will extend across and close the opening in one position and will clear the opening in another position thereof, and means for conveying crop material to the region of said opening; a substantially L-shaped box-like feeder head having a section of a size adapted to enter said opening at times when said plunger is clear of said opening, and having a portion journaled on an axis adjacent said wall provided with said opening, and spaced therefrom sufficiently that the first mentioned section will pass through said opening into and out of said bale case by reason of oscillation of said L-shaped feeder head about said axis, a lever arm fixed in relation to said L-shaped head and extending into said bale case alongside said plunger substantially normal to the direction of movement of said plunger when said section is in said bale case, and a link in said bale case alongside said plunger, connected to said lever and extending generally parallel to the direction of movement of said plunger when said section is in said bale case, and connected with said plunger for oscillating said feeder head in synchronism with the reciprocations of said plunger, said link being sufficiently short in relation to the length of the plunger stroke that said lever arm will position it substantially normal to the direction of movement of said plunger when the latter is at the end of its stroke closing said opening.

5. In a feeder for a baler of the type having walls enclosing a bale case, a crop compressing plunger reciprocable in the case, means for reciprocating said plunger, and one of said walls providing an opening traversed by said plunger in the reciprocations thereof so that said plunger will extend across and close the opening in one position and will clear the opening in another position thereof, and means for conveying crop material to the region of said opening; a box-like feeder head of a size adapted to enter said opening at times when said plunger is clear of said opening, and having an offset portion journaled on an axis adjacent said wall provided with said opening, and spaced therefrom sufficiently that the box-like portion will pass through said opening into and out of said bale case by reason of oscillation of said feeder head as a whole about said axis, a lever arm fixed in relation to said L-shaped head and extending transversely of the direction of movement of said plunger the major portion of the distance across said bale case when said section is in said bale case, and a link connected to said lever and extending generally in the direction of movement of said plunger, away from said opening when said section is in said bale case, and connected with said plunger for oscillating said feeder head in synchronism with reciprocations of said plunger, said link being of a length such that it will take a position substantially at right angles to said direction of movement of said plunger when said section is out of said chamber.

6. In a feeder for a baler of the type having walls enclosing a bale case, a crop compressing plunger reciprocable in the case, means for reciprocating said plunger, and one of said walls providing an opening traversed by said plunger in the reciprocations thereof so that said plunger will extend across and close the opening in one position and will clear the opening in another position thereof, and means for conveying crop material to the region of said opening; a substantially L-shaped box-like feeder head having a section of a size adapted to enter said opening at times when said plunger is clear of said opening, and a portion journaled on a shaft rotatably supported adjacent said wall provided with said opening, and spaced therefrom sufficiently that the first mentioned section will pass through said opening into and out of said bale case by reason of oscillation of said L-shaped feeder head about said shaft, a lever arm fixed in relation to said shaft and extending transversely of the direction of movement of said plunger when said section is in said bale case, and a link connected to said lever and extending generally in the direction of movement of said plunger, away from said opening when said section is in said bale case, and connected with said plunger for oscillating said feeder head in synchronism with reciprocations of said plunger, an actuating arm within said box-like head and fixed in relation to said shaft, an abutment within said head spaced from said arm, and resilient connection means between said arm and said abutment for yieldingly actuating said feeder head in response to oscillating of said arm by reason of rocking of said shaft.

7. In a feeder for a baler of the type having walls enclosing a bale case, a crop compressing plunger reciprocable in the case, means for reciprocating said plunger, and one of said walls providing an opening traversed by said plunger in the reciprocations thereof so that said plunger will extend across and close the opening in one position and will clear the opening in another position thereof, and means for conveying crop material to the region of said opening; a substantially L-shaped feeder head having a section of a size adapted to enter said opening at times when said plunger is clear of said opening, a rockshaft journaled on said bale case adjacent said wall provided with said opening, said feeder head having a portion journaled on said rock shaft and spaced thereby from said opening sufficiently that the first mentioned section will pass through said opening into and out of said bale case by reason of oscillation of said L-shaped feeder head about the axis of said shaft, a lever arm journaled on said shaft and extending transversely of the direction of movement of said plunger when said section is in said bale case, a link connected to said lever and extending generally in the direction of movement of said plunger, away from said opening when said section is in said bale case, and connected with said plunger for oscillating said lever arm in synchronism with reciprocations of said plunger, a quadrant portion on said lever arm, a plate fixed on said rock shaft adjacent said quadrant portion and fixed to said quadrant portion in a predetermined position, and means for securing said quadrant to said plate in another position whereby to adjust the relation between said feeder head and said lever arm.

References Cited in the file of this patent

UNITED STATES PATENTS

| | | |
|---|---|---|
| 697,692 | Symank et al. | Apr. 15, 1902 |
| 771,967 | Blount | Oct. 11, 1904 |
| 839,247 | Winch | Dec. 25, 1906 |
| 865,614 | Schubert | Sept. 10, 1907 |
| 878,880 | Holdeferield | Feb. 11, 1908 |
| 907,654 | Tuttle | Dec. 22, 1908 |
| 1,164,121 | Rust | Dec. 14, 1915 |

FOREIGN PATENTS

| | | |
|---|---|---|
| 18,394 | Denmark | Jan. 26, 1914 |